United States Patent
Quis et al.

(10) Patent No.: US 7,049,355 B2
(45) Date of Patent: May 23, 2006

(54) LOW-ODOR, COLD-CURING (METH) ACRYLATE REACTION RESIN FOR FLOOR COATING, A FLOOR COATING CONTAINING THE REACTION RESIN, AND A PROCESS FOR THE PREPARATION OF THE FLOOR COATING

(75) Inventors: Peter Quis, Darmstadt (DE); Colin Liddiard, Weiterstadt (DE); Manfred Braum, Mainz (DE)

(73) Assignee: Roehm GmbH & Co. KG, Darmstadt (DE)

( * ) Notice: Subject to any disclaimer, the term of this patent is extended or adjusted under 35 U.S.C. 154(b) by 369 days.

(21) Appl. No.: 09/333,917

(22) Filed: Jun. 16, 1999

(65) Prior Publication Data

US 2002/0002259 A1    Jan. 3, 2002

(30) Foreign Application Priority Data

Jun. 16, 1998    (DE) ................................ 198 26 412

(51) Int. Cl.
*C08L 51/00*    (2006.01)

(52) U.S. Cl. .................... 524/31; 427/122; 524/35; 524/533; 524/548; 526/87; 526/323.1; 526/323.2

(58) Field of Classification Search .............. 427/122; 524/31, 35, 533, 548; 526/87, 323.1, 323.2
See application file for complete search history.

(56) References Cited

U.S. PATENT DOCUMENTS 4,451,608 A * 5/1984 Drake et al. ................ 524/560
5,250,609 A * 10/1993 Kato et al. .................. 524/560
5,456,905 A * 10/1995 Valenty ........................ 424/61
5,516,546 A * 5/1996 Hari et al. ................... 427/122
6,001,896 A * 12/1999 Ueno et al. ................. 523/116

FOREIGN PATENT DOCUMENTS

| DE | 39 03 670 C1 | 7/1990 |
| EP | 0 693 503 | 1/1996 |
| EP | 0 693 503 A1 | 1/1996 |
| EP | 0 742 264 A2 | 11/1996 |
| FR | 1426188 | 10/1964 |
| JP | 08-217837 | 8/1996 |

OTHER PUBLICATIONS

Patent Abstract of Japan, vol. 1996, Dec. 26, 1996, JP 08 217837, Aug. 27, 1996.
Herstellung, et al., Kunststoff-Handbuch, Band IX, "Polymethacrylate", pp. 43-56 (1975).
Technical Brochure von Alf Atochem bezueglich Norsocryl® DCPOEMA.

* cited by examiner

*Primary Examiner*—Bernard Lipman
(74) *Attorney, Agent, or Firm*—Oblon, Spival, McClelland, Maier & Neustadt, P.C.

(57) ABSTRACT

The present invention relates to a low-odor, polymerizable, cold-curing (meth)acrylate composition for floor coatings exhibiting low health hazards during application and consisting of (A) 50–100 wt % a (meth)acrylate; (B) 0–2 parts by weight per 1 part by weight of (A) of a pre-polymer that dissolves or swells in (A); (C) 2–5 parts by weight per 100 parts by weight of (A+B) of at least one paraffin and/or wax; (D) a redox system, containing an accelerator and a peroxide catalyst or initiator in an amount that is adequate for cold-curing of Component A; and (E) a conventional additive.

4 Claims, No Drawings

LOW-ODOR, COLD-CURING (METH) ACRYLATE REACTION RESIN FOR FLOOR COATING, A FLOOR COATING CONTAINING THE REACTION RESIN, AND A PROCESS FOR THE PREPARATION OF THE FLOOR COATING

BACKGROUND OF THE INVENTION

1. Field of the Invention

The present invention relates to a low-odor, polymerizable, cold-curing (meth)acrylate system for a floor coating. The invention also relates to a coated floor, that can be obtained using an appropriate low-odor, polymerizable, cold-curing reactive (meth)acrylic system. The invention also includes a process for preparing a coated surface, especially a floor.

2. Discussion of the Related Art

The processing of reaction resins based on methyl (meth) acrylate to floor coatings is normally associated with a strong offensive odor. Frequently, the maximum workplace concentration limiting values cannot be met.

Low-odor (meth)acrylate systems are, for example, described in JP 95-46571 disclosing a system that contains unsaturated resins, cyclopentadienyl (meth)acrylates, crosslinking agents such as, for example, organic peroxides, and accelerators such as metal salts of organic acids. It was shown that a system that includes cumene hydroperoxide as the hardener and cobalt octanoate as the accelerator, hardens.

Additional systems that likewise use cumene hydroperoxide and cobalt octanoate are described in Japanese disclosures JP 95-5661 and JP 94-199 427.

Although these systems solve the problem of the offensive odor, health risks during application of these systems remain due to the use of the problematical reaction system of the compound and cumene hydroperoxide.

In consideration of the state of the art, it is a goal of the present invention to make available a low-odor, cold-curing (meth)acrylate reaction resin for a floor coating that has especially low health risks during application.

SUMMARY OF THE INVENTION

This goal, as well as others that are not explicitly indicated but which can easily be surmised or deduced from the relations discussed herein, are attained by a reaction resin for a floor coating, comprising:

(A) 50–100 wt % a (meth)acrylate comprised of
- 0–5 wt % of a methyl (meth)acrylate;
- 0–5 wt % of an ethyl (meth)acrylate;
- 0–97 wt % of a $C_3$–$C_6$ (meth)acrylate;
- 0–50 wt % of $\leq C_7$ (meth)acrylate;
- 3–10 wt % of a multifunctional (meth)acrylate; and
- 0–50 wt % of a comonomer, comprised of
- 0–30 wt % of a vinyl aromatic; and
- 0–30 wt % of a vinyl ester wherein the constituents of Component A comprise 100 wt %;

(B) 0–2 parts by weight per 1 part by weight of (A) of a pre-polymer that dissolves or swells in (A); and wherein the proportion of methyl (meth)acrylate or ethyl (meth)acrylate is <5 wt %, based on (B);

(C) 2–5 parts by weight per 100 parts by weight (A+B) of at least one paraffin and/or wax;

(D) a redox system, which is kept separate up to the point of polymerization of the polymerizable components of the system, at least with respect to one component of the redox system, said redox system containing an accelerator and a peroxide catalyst or initiator in an amount that is adequate for cold-curing of Component A; and E) a conventional additive.

DESCRIPTION OF THE PREFERRED EMBODIMENTS

The reaction resin of the invention for a floor coating, with an excellent overall spectrum of properties, can be prepared by suitable choice of individual components with respect to type and amount:

- complete curing on different substrates so that the reaction resin is no longer tacky after 0.5 to 5 hours, preferably after approximately 2 hours;
- rapid curing by use of an accelerator and an initiator;
- good adhesion on many substrates such as plastics, plaster floors, concrete; and
- low odor.

In a useful variant of the invention, the reaction resin is characterized by the fact that Component E is present in an amount of 0 to 100 parts by weight per 10 parts by weight of Components A+B.

An advantageous embodiment of the invention is based on Component A consisting of butyl methacrylate and 1,4-butanediol dimethacrylate.

A further improvement in the reaction resin of the invention is achieved by the optional addition of a pre-polymer based on a (meth)acrylate.

Resins of the invention wherein the proportion of Component C is 2.5 to 3.5 parts by weight per 100 parts by weight of the sum of Components A+B are also of special interest.

In addition, it is preferred that a system of amines, especially N,N-bis-(2-hydroxyethyl)-p-toluidine and dibenzoylperoxide are used as Component D of the resin.

A further aspect of the invention can be seen in the low-odor floor coatings that can be obtained by application and curing at temperatures of −10 to +45° C. of a polymerizable cold-curing (meth)acrylate system of the invention.

A process for preparation of the low-odor floor coatings is also an object of the invention, wherein a low-odor, cold curing, (meth)acrylate reaction resin for a floor coating consisting of Components A to E described above is applied to an area to be coated and is allowed to set.

In an especially preferred embodiment of the process of the invention, curing can occur at ambient temperature.

Component A

Component A of the reaction resin for a floor coating comprises essentially ethylenically unsaturated monomers. These can contain one or several reactive double bonds.

At least 50 wt % of these monomers are (meth)acrylates, wherein, within the scope of the invention, "(meth)acrylate" means acrylate and/or methacrylate.

As esters of acrylic acid or methacrylic acid, only those with a relatively high vapor pressure at room temperature can be considered for the invention. In general, compounds with a boiling point higher than 120° C. at normal pressure, preferably higher than 140° C., especially useful, higher than 150° C., are preferred. The alcohol moiety can contain hereto atoms, for example in the form of ether, alcohol, carboxylic acid, ester, and urethane groups.

In this connection, it is important that Component A contain only low amounts, preferably less than 5 wt % of methyl (meth)acrylate or ethyl (meth)acrylate. Preferably, Component A contains no methyl (meth)acrylate or ethyl (meth)acrylate.

Examples of acrylates that can be used within the scope of the invention are, but not limited to, alkylacrylates such as bis-2-methylacrylate acid ester (isocrotonic acid ester), trans-2-methylacrylic acid ester (isocrotonic acid ester); arylacrylates such as substituted benzylacrylates; or unsaturated alkylacrylates such as, for example, allyl acrylate.

Methacrylates that can be used especially successfully within the scope of the invention include, but are not limited to, alkylmethacrylates derived from saturated alcohols such as isopropyl methacrylate, propyl methacrylate, n-butyl methacrylate, tert-butyl methacrylate, n-hexyl methacrylate, n-octyl methacrylate, n-decyl methacrylate, isooctyl methacrylate, tetradecyl methacrylate, etc.;

alkylmethacrylates derived from unsaturated alcohols such as, oleyl methacrylate, 2-propynyl methacrylate, allyl methacrylate, vinyl methacrylate, etc.;

amides and nitriles of methacrylic acid such as, but not limited to, N-(methylaminopropyl)methacrylamid, N-(diethylphosphono)methacrylamide, 1-methacryloylamido-2-methyl-2-propanol, N-(3-dibutylaminopropyl)methacrylamide, N-t-butyl-N-(diethylphosphono)methacrylamide, N,N-bis(2-diethylaminoethyl)methacrylamide, 4-methacryloylamido-4-methyl-2-pentanol, methacryloyamidoacetonitrile, N-(methoxymethyl)methacrylamide, N-(2-hydroxyethyl)methacrylamide, N-acetylmethacrylamide, N-(dimethylaminoethyl)methacrylamide, N-methyl-N-phenylmethacrylamide, N,N-dimethylmethacrylamide, N-methylmethacrylamide, N,N-dimethylmethacrylamide, N-isopropylinethacrylamide;

aminoalkyl methacrylates such as tris(2-methacryloxyethyl)amine, N-methylformamidoethyl methacrylate, 3-diethylaminopropyl methacrylate, 2-ureidoethyl methacrylate;

other nitrogen-containing methacrylates such as N-(methacryloyloxyethyl)diisobutylketimine, 2-methacryloyloxyethylmethylcyanimide, cyanomethyl methacrylate;

aryl methacrylates such as nonylphenyl methacrylate, benzyl methacrylate, phenyl methacrylate, wherein the aryl residue in each case can be nonsubstituted or substituted up to 4 times;

carbonyl-containing methacrylates such as 2-carboxyethyl methacrylate, carboxymethyl methacrylate, N-(2-methacryloyloxyethyl)-2-pyrrolidinone, N-(3-methacryloyloxypropyl)-2-pyrrolidinone, N-methacryloylmorpholine, oxazolidinylethyl methacrylate, N-(methacryloyloxy)formamide, acetonyl methacrylate, N-methacryloyl-2-pyrrolidinone;

cycloalkyl methacrylates such as 3-vinylcyclohexyl methacrylate, 3,3,5-trimethylcyclohexyl methacrylate, bornyl methacrylate, cyclopenta-2,4-dienyl methacrylate, isobornyl methacrylate, 1-methylcyclohexyl methacrylate;

glycol dimethacrylates such as 1,4-butanediol methacrylate, methylene methacrylate, 1,3-butanediol methacrylate, triethylene glycol methacrylate, 2,5-dimethyl-1,6-hexanediol methacrylate, 1,10-decanediol methacrylate, 1,2-propanediol methacrylate, diethylene glycol methacrylate, ethylene glycol methacrylate;

hydroxyalkyl methacrylates such as 3-hydroxypropyl methacrylate, 3,4-dihydroxybutyl methacrylate, 2-hydroxyethyl methacrylate, 2-hydroxypropyl methacrylate;

methylacrylates of ether alcohols such as tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate;

methacrylates of halogenated alcohol moieties such as 2,3-dibromopropyl methacrylate, 4-bromophenyl methacrylate, 1,3-dichloro-2-propyl methacrylate, 2-bromoethyl methacrylate, 2-iodoethyl methacrylate, chloromethyl methacrylate;

oxiranyl methacrylates, such as 10,11-epoxyundecyl methacrylate, 2,3-epoxycyclohexyl methacrylate, 2,3-epoxybutyl methacrylate, 3,4-epoxybutyl methacrylate, glycidyl methacrylate;

phosphorus-, boron- and/or silicon-containing methacrylates such as 2-(dibutylphosphono)ethyl methacrylate, 2,3-butylenemethacryloylethyl borate, 2-(dimethylphosphato)propyl methacrylate, methyldiethoxymethacryloylethoxysilane, 2-(ethylenephosphito)propyl methacrylate, dimethylphosphinomethyl methacrylate, dimethylphosphonoethyl methacrylate, diethylmethacryloyl phosphonate, diethylphosphatoethyl methacrylate, dipropylmethacryloyl phosphate;

sulfur-containing methacrylates such as ethylsulfinylethyl methacrylate, 4-thiocyanatobutyl methacrylate, ethylsulfonylethyl methacrylate, thiocyanatomethyl methacrylate, methylsulfinylmethyl methacrylate, bis(methacryloyloxyethyl) sulfide;

trimethacrylates such as trimethyloylpropane trimethacrylate.

Acrylates corresponding to methacrylates that have a boiling point greater than 120° C. can likewise be used.

The indicated compounds can also be used as mixtures. (Meth)acrylates in which the alcohol residue contains 3 to 5 carbon atoms are preferred. Although longer-chained esters, that is compounds in which the alcohol moiety contains 7 or more carbon atoms, make the coatings more flexible; they also make them softer so that their usage properties are limited. For this reason their proportion is limited to 50 wt % or less.

Especially preferred (meth)acrylates include, but are not limited to, n-butyl methacrylate, tert-butyl methacrylate, isobutyl methacrylate, hexyl methacrylate, hexyl acrylate, cyclohexyl methacrylate, cyclohexyl acrylate, benzyl methacrylate and benzyl acrylate.

As an essential component to the invention, Component A contains between 3 and 10 wt % of one or several (meth)acrylates.

These include, among others, bi-, tri- and multifunctional compounds. Special preference is given to bifunctional (meth)acrylates as well as trifunctional (meth)acrylates.

(a) Preferred Bifunctional (meth)acrylates Include compounds of the formula (I)

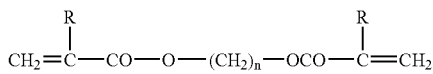

in which R is hydrogen or a methyl group and n is integer between 3 and 20. Representative compounds include a di(meth)acrylate of propanediol, butanediol, hexanediol, octanediol, nonanediol, decanediol, and eicosanediol;

compounds of the formula (II)

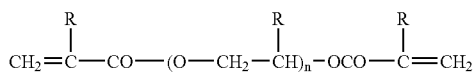

in which R is hydrogen or a methyl group and n is an integer between 1 and 14. Representative compounds include a di(meth)acrylate of ethylene glycol, diethylene glycol, triethylene glycol, tetraethylene glycol, dodecaethylene glycol, tetradecaethylene glycol, propylene glycol, dipropylene glycol, and tetradecapropylene glycol; and glycerin di(meth)acrylates such as 2,2'-bis-4-(3-methacryloxy-β-hydroxypropoxy)phenylpropane (bis-GMA), bisphenol A, dimethacrylate, neopentylglycol dimethacrylate, 2,2'-di(4-methacryloxypolyethoxyphenyl)propane with 2 to 10 ethoxy groups per molecule, and 1,2-bis-(3-methacryloxy-2-hydroxypropoxy)butane;

(b) tri- or multifunctional (meth)acrylates, include trimethylopropane (tri)methacrylates; and (c) urethane (meth)acrylates, such as reaction products from 2 moles of a hydroxy group-containing (meth)acrylate monomer with 1 mole of diisocyanate, and reaction products from a urethane prepolymer with 2 NCO terminal groups with a methacrylic monomer that has one hydroxyl group, as it is represented by the formula (II)

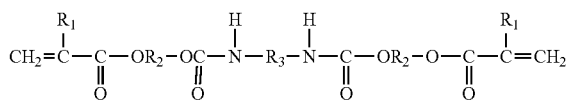

wherein $R_1$ represents hydrogen or a methyl group, $R_2$ is an alkylene group, and $R_3$ is an organic moiety.

The monomers indicated in (a) to (c) above, capable of crosslinking action, are used either alone or in a mixture thereof.

Multifunctional monomers that are preferred when used in the resins of the invention include, but are not limited to, trimethyloylpropane trimethacrylate (TRIM), 2,2-bis-(4-(3-methacryloxy-2-hydroxypropoxy)phenylpropane (bis-GMA), 3,6-dioxaoctamethylene dimethacrylate (TEDMA), 7,7,9-trimethyl-4,13-dioxo-3,14-dioxa-5,12-diazahexadecane-1,16-dioxydimethacrylate (UDMA), and/or 1,4-butanediol dimethacrylate (1,4-BDMA). Of these, 1,4-butanediol dimethacrylate is most preferred.

In addition, Component A can also contain other comonomers that can be copolymerized with the above-indicated (meth)acrylates. These include, but are not limited to, a vinyl ester, vinyl chloride, vinylidene chloride, vinyl acetate, styrene, a substituted styrene with an alkyl substituent in the side chain, such as, α-methylstyrene and α-ethylstyrene, substituted styrenes with an alkyl substituent on the ring such as, vinyltoluene and p-methylstyrene, halogenated styrenes such as, a monochlorostyrene, a dichlorostyrene, a tribromostyrene, and a tetrabromostyrene; a vinyl and isopropenyl ether, a maleic acid derivative such as, maleic acid anhydride, methylmaleic acid anhydride, maleic imide, methylmaleic imide, phenylmaleic imide, and cyclohexylmaleic imide; and dienes such as, for example, 1,3-butadiene and divinylbenzene.

The proportion of the comonomers is limited to 50 wt % or less of Component A since otherwise the mechanical properties of the polymerized coating would be negatively affected. In this connection, the proportion of a vinyl aromatic is limited to 30 wt % or less of Component A since higher amounts can lead to demixing of the system. The proportion of vinyl ester is likewise limited to 30 wt % or less of Component A, since, at low temperatures, compositions with vinyl ester at higher amount set only inadequately and tend to result in a disadvantageous shrinking behavior.

Substantially all of the above-discribed monomers contained in Component A are commercially available or they can be prepared by known methods.

Component (B)

To adjust the viscosity of the reaction resin and the spreading properties, as well as to improve curing or other properties of the resin or the polymerized coating, a polymer or a pre-polymer can be added to Component (A). This pre-polymer should be able to dissolve or swell in Component (A). Between 0 and 2 parts by weight of the pre-polymer can be used per part by weight of Component (A).

Suitable materials for Component (B), include, but are not limited to, a poly(meth)acrylate that can be dissolved in Component (A) as a solid polymer. They can likewise be used as so-called syrups, i.e., as partially polymerized pastes of the corresponding monomers. In this connection, it is important that these pastes only contain low amounts, preferably less than 5 wt % of methyl methacrylate or ethyl methacrylate. Preferably Component (B) contains no methyl methacrylate or ethyl methacrylate.

In addition, polyvinylchloride, polyvinylacetate, a polystyrene, an epoxy resin, a epoxide (meth)acrylate, an unsaturated polyester, a polyurethane, or mixtures thereof of the above-indicated poly(meth)acrylates are among other preferred materials as Component B. The indicated pre-polymer can also be used as a copolymer.

Pre-polymers that can be used with special success within the scope of the invention include, but are not limited to, binders based on a (meth)acrylate that do not liberate a monomer, such as, for example, PLEXIGUM PM 381®, which is available from Röhm GmbH.

These polymers serve, for example, to regulate flexibility properties and shrinkage, as stabilizers, skin forming agents, as well as spreading improvers.

The above-indicated pre-polymers are generally commercially available. However, they can also be prepared in a manner known to those skilled in the art.

Reaction resins that are developed for preparation of thin coatings with a thickness of less than 5 mm preferably contain at least 1 wt %, more preferably, at least 3 wt %, based on the sum of Components A+B, of a polymer, such as of a poly(meth)acrylate.

Component C

Upon curing, methacrylic resins tend towards air inhibition. This leads to the fact that the upper layers that can come into contact with air remain tacky to an increased extent and do not solidify like the rest of the mass. To prevent or improve this behavior, paraffins and/or waxes are added to the resin, their concentration preferably being close to their solubility limit in the resin. Although Applicants do not wish to be limited by any theories, in their opinion, upon evaporation of the volatile components, the solubility limit is exceeded, a fine paraffin film forms on the surface and effectively prevents air inhibition of the upper resin layers and, thus, leads to a drier surface.

The waxes and paraffins involved are generally nonpolar substances that dissolve in the liquid unset resin. With increased crosslinking during polymerization, their compatibility with the resin decreases so that they form a second phase and can migrate to the surface of the polymerizing mass of resin. They are in a position to form a coherent film on the surface and protect the mass against oxygen from the air. This exclusion of oxygen supports the polymerization of the resin on the surface. In particular, the addition of waxes and/or paraffins decreases the tackiness of the surface and, thus, the inhibition effect of oxygen can be counteracted.

In principle, any substance that shows the above-described behavior of homogeneous surface layer formation upon falling below the limits of solubility is suitable for use in accordance with the present invention.

Accordingly, suitable waxes include, but are not limited to, a paraffin, microcrystalline wax, carnauba wax, beeswax, lanolin, whale oil, a polyolefin wax, ceresin, candelilla wax, etc.

However, a paraffin is especially preferred. Paraffins consist primarily of linear hydrocarbons having the general formula $C_nH_{2n+2}$, where n is 10–70 and a proportion of iso- and cycloalkanes/paraffins of 0 to 60%. These waxes obtained from vacuum distillation cuts of light and middle lubricating oils, have the advantage that they are extremely non-reactive under the conditions prevailing (meth)acrylate resins. They are insoluble in water and sparingly soluble in low molecular weight aliphatic alcohols and ethers. They have a better solubility in ketones, chlorohydrocarbons, naphtha, benzene, toluene, xylene, and higher aromatics. The solubility decreases with a higher melting point, i.e., with increasing molecular weight of the wax. The softening point of the macrocrystalline paraffins is between 35 and 72° C. Commercial products have viscosities between 2 and 10 $mm^2/s$ at 100° C. Among others, completely refined and de-oiled waxes have shown themselves to be preferred for use, in the (meth)acrylate resins of the invention for surface coating. The oil content of these is a maximum of 2.5 wt %. Special preference is given to products with a softening point between 40 and 60° C. and a viscosity of 2.0 to 5.5 $mm^2/s$ at 100° C.

According to the invention, the waxes and/or paraffins are added in an amount of 2.0 to 5 wt %, preferably 3 wt %, based on the total weight of Components A and B. If the amount of wax and/or paraffin added exceeds 5 wt %, it can have a negative effect on the strength of the surface coating. If the added amount of wax and/or paraffin is less than 2 wt %, the low-odor resins do not set without tackiness.

Since the paraffins and/or waxes produce the effect desired by the invention via evaporation, it is necessary that Component A shows sufficient evaporation. For this reason, monomeric (meth)acrylates with $C_3$–$C_6$ ester groups are especially preferred.

Component D

The resin comprising Components A to D of the invention is suitable for cold curing, i.e., it contains a redox system of an accelerator and a peroxide catalyst or initiator for polymerization. The amounts in which these accelerators and initiators are added dependent on the respective system. However, they must be adequate for cold curing of Component A.

The accelerator is usually used in an amount of 0.01 to 5 wt %, preferably 0.5 to 1.5 wt %, based on the sum of Components A to D. Compounds that are especially suitable as an accelerator include, but are not limited to, amines and mercaptans such as, for example, dimethyl-p-toluidine, diisopropoxy-p-toluidine, N,N-bis-(2-hydroxyethyl)-p-toluidine, dimethylaniline, and glycol dimercaptoacetate, where N,N-bis-(2-hydroxyethyl)-p-toluidine and dimethyl-p-toluidine are particularly preferred.

In addition, organic salts can serve as accelerators, which are usually used in a range of 0.001 to 2 wt %, based on the sum of Components A to D. These include, among others, copper naphthenate and copper oleate.

As the peroxide catalyst or initiator, especially suitable are linking groups such as a ketone peroxide, a diacyl peroxide, a per-ester, a per-ketal, mixtures of linked groups as well as effective curing agents and initiators.

Especially preferred for this purpose are compounds such as methyl ethyl ketone peroxide, acetylacetone peroxide, ketone peroxide, methyl isobutyl ketone peroxide, cyclohexanone peroxide, dibenzoyl peroxide, tert-butyl peroxybenzoate, tert-butyl peroxyisopropyl carbonate, 2,5-bis-(2-ethylhexanoylperoxy)-2,5-dimethylhexane, tert-butyl peroxy-2-ethylhexanoate, tert-butyl peroxy-3,5,5-trimethylhexanoate, 1,1-bis-(tert-butyl peroxy)cyclohexane, 1,1-bis-(tert-butyl peroxy)-3,3,5-trimethylcyclohexane, cumyl hydroperoxide, tert-butyl hydroperoxide, dicumyl peroxide, bis-(4-tert-butylcyclohexyl) peroxidecarbonate, mixtures of ketone-peroxides, per-esters, as well as mixtures of two or more of the above-mentioned compounds with one another. Of the above-mentioned compounds, dibenzoyl peroxide is preferred.

The initiators are usually used in an amount in the range of 0.1 to 10 wt %, preferably from 0.5 to 5 wt %, based on the sum of Components A to D. Component D of the resin can already contain the accelerator, e.g., dimethyl-p-toluidine, without polymerization occurring at ambient temperature. By addition of the remaining constituents of Component D, the reaction starts, wherein Component D is normally chosen in such a manner that the (meth)acrylate system has a pot life of 10 min to 20 min. The (meth)acrylate system of the invention therefore contains only the complete Component D immediately prior to use; until the time of use, Component D is not contained or contained only in part, in other words, the complete functioning redox system must be kept away from it until the point of polymerization of the polymerizable components, whereas some components of the redox system can already be premixed with the polymerizable substances.

Component E

Component E is optional. It includes a number of conventional additives for (meth)acrylate reaction resins for floor coatings. Examples of suitable additives as Component E, include but are not limited to, a binder, an antistatic agent, an antioxidant, a biostabilizer, a chemical blowing agent, a mold-release agent, a flame retardant, a lubricant flow improver, a filler, a slip agent, an inhibitor, a catalyst, a light-stabilizing brightener, an organic phosphate, an oil, a pigment, an impact strength improver, a reinforcing agent, a reinforcing fiber, a weathering protectant, and a plasticizer.

These optional additives can be contained in the resin of the invention in variable amounts. Some additives are especially preferred within the scope of the invention such as, for example, the additives of Groups E1 to E4 described below.

Group E1

As additives to the resins of the invention, the group of inhibitors E1 deserves special interest.

As protection against undesired premature curing, inhibitors can be added to the polymerizable resin mixture. These act as radical chain breaking reagents to capture the radicals that are usually present and increase the storability of the resin preparation substantially. However, if initiated curing is desired by the addition of organic peroxides, the added inhibitors have the advantage of being rapidly overwhelmed. Primarily 1,4-dihydroxybenzenes are used. However, otherwise substituted dihydroxybenzenes can also be used. Such inhibitors can generally be described by general formula E1.I

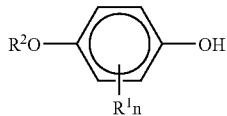
(E1.I)

in which $R^1$ is a linear or branched alkyl residue with one to eight carbon atoms, a halogen, or an aryl, preferably an alkyl residue with one to four carbon atoms, especially preferred, methyl, ethyl, n-propyl, isopropyl, n-butyl, isobutyl, sec-butyl, tert-butyl, Cl, F, or Br; n is an integer in the range of one to four, preferably one or two; and $R^2$ is hydrogen, a linear or branched alkyl group with one to eight carbon atoms or an aryl, preferably an alkyl group with one to four carbon atoms, especially, methyl, ethyl, n-propyl, iso-propyl, n-butyl, isobutyl, sec-butyl, tert-butyl. However, compounds with 1,4-benzoquinone as the base compound can also be used. These can be described by formula E1.II

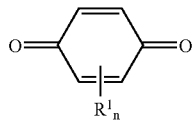
(E1.II)

in which $R^1$ is a linear or branched alkyl group with one to eight carbon atoms, a halogen or an aryl, preferably an alkyl group with one to four carbon atoms, especially, methyl, ethyl, n-propyl, isopropyl, n-butyl, sec-butyl, tert-butyl, Cl, F, or Br; and n is an integer in the range of one to four, preferably one or two.

Likewise, phenols with the general structure E1.III are used,

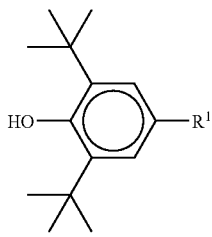
(E1.II)

in which $R^1$ is a linear or branched alkyl group with one to eight carbon atoms, an aryl or arylalkyl group, a propionic acid ester with mono- to tetrafunctional alcohols that can also contain hetero atoms such as S, O, and N, preferably an alkyl group with one to four carbon atoms, especially, methyl, ethyl, n-propyl, isopropyl, n-butyl, isobutyl, sec-butyl, tert-butyl.

An additional advantageous class of substances is that of the hindered phenols based on triazine derivatives of formula E1.IV

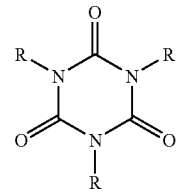
(E1.IV)

where R is the compound of formula E1.V (E1.V)

in which $R^1$ is $C_nH_{2n+1}$ and n=1 or 2.

The following compounds are preferred: 1,4-dihydroxybenzene, 4-methoxyphenol, 2,5-dichloro-3,6-dihydroxy-1,4-benzoquinone, 1,3,5-trimethyl-2,4,6-tris(3,5-di-tert-butyl-4-hydroxybenzyl) benzene, 2,6-di-tert-butyl-4-methylphenol, 2,4-dimethyl-6-tert-butylphenol, 2,2-bis(3,5-bis(1,1-dimethylethyl)-4-hydroxyphenyl-1-oxoperoxymethyl)), 1,3-propanediyl ester, 2,2'-thiodiethyl-bis(3-(3,5-di-tert-butyl-4-hydroxyphenyl)) propionate, octadecyl-3-(3,5-di-tert-butyl-4-hydroxyphenyl) propionate, 3,5-bis(1,1-dimethylethyl-2,2-methylene)-bis(4-methyl-6-tert-butyl)phenol, tris(4-tert-butyl-3-hydroxy-2,6-dimethylbenzyl)-s-triazine-2,4,6 (1H,3H,5H)-trione, tris(4-tert-butyl-3-hydroxybenzene.

Based on the weight of the total recipe of the resin, the proportion of inhibitors, alone or as a mixture, is generally 0.0005–1.3% (wt/wt).

Group E2

Another important group of substances among the additives and added substances is a filler.

As a filler and/or pigment in the liquid resin preparation, all conventional additives are suitable such as, e.g., a natural and synthetic calcium carbonate, dolomite, calcium sulfate, a silicate such as, e.g. aluminum silicate, zirconium silicate, talc, kaolin, mica, feldspar, nepheline, syslite, wollastonite, glass beads or silicate beads, silicon dioxide in the form of sand, quartz, quartzite, novaculite, perlite, tripoli, and diatomaceous earth, a barium sulfate, a carbide such as SiC, a sulfide (e.g., $MoS_2$, ZnS), or also a titanate such as, e.g., $BaTiO_3$, a molybdate such as, e.g., zinc, calcium, barium or strontium molybdates, and a phosphate such as, e.g., of zinc, calcium or magnesium. Likewise well-suited are metal powders or metal oxides such as, e.g., Al powder, silver powder, or aluminum hydroxide. Also used are carbon black, graphite powder, wood flour, a synthetic fiber (based on polyethylene terephthalate, polyvinyl alcohol), a basalt fiber, a carbon fiber, an aramide fiber, polybenzimidazole fibers, PEEK fibers, polyethylene fibers, boron fibers, or ceramic fibers. The usual percentage amount with respect to the overall composition is between 0 and 60% wt/wt.

Group E3

Also of special interest among the possible additives is the group of antioxidants and heat stabilizers E3.

Preferred examples for additives of Group E3 that can be considered, the following can be mentioned: chloranilic acid (2,5-dichloro-3,6-dihydroxy-1,4-benzoquinone), hydroquinone (1,4-dihydroxybenzene), IRGANOX 1330 (1,3,5-trimethyl-2,4,6-tris(3,5-di-tert-butyl-4-hydroxybenzyl)benzene, VULKANOX BHT (2,6-di-tert-butyl-4-methylphenol), 4-tert-butylpyrocatechin, compounds of the general formula E3.I

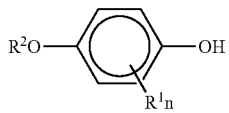

(E3.I)

in which n is a whole number in the range of 1 to 4, $R^1$ is a substituted or nonsubstituted, linear or branched alkyl group with 1 to 8 carbon atoms, preferably with 1 to 4 carbon atoms, an aryl group or a halogen, preferably chlorine, fluorine or bromine, and $R^2$ is hydrogen or a substituted or nonsubstituted, linear or branched alkyl group with 1 to 8 carbon atoms, preferably with 1 to 4 carbon atoms, IRGANOX 1010 (3,5-bis-(1,1-dimethylethyl-2,2-methylene-bis(4-methyl-6-tert-butyl)phenol)), IRGANOX 1035 (2,2'-thiodiethyl-bis(3-(3,5-di-tert-butyl-4-hydroxyphenyl)) propionate), IRGANOX 1076 (octadecyl-3-(3,5-di-tert-butyl-4-hydroxyphenyl) propionate), TOPANOL O, CYANOX 1790 tris(4-tert-butil-1-3-hydroxy-2,6-dimethylbenzyl)-s-triazine-2,4,6 (1H,3H,5H)-trione, IRGANOX 1098, etc.

Group E4

An additional group of special additives is the group of plasticizers.

Plasticizers serve as, e.g., acceptors of peroxide components for the automatic two-component mixing process (inhibitor) to control the compressive strength and tensile strength in bending as well as for adjusting the surface tension.

Preferred plasticizers for use in (meth)acrylate reaction resins are, but not limited to, a phthalic acid ester, an adipic acid ester, a chloroparaffin, a urea resin, a melamine resin, a modified phenolate, and a polyglycol urethane.

The reaction resins of the invention can contain up to 7 parts by weight, preferably up to 2 parts by weight, of a plasticizer per 10 parts by weight of the sum of Components A+B.

Low-odor floor coatings can be obtained by application and curing of a polymerizable, cold-curing (meth)acrylate system at temperatures of −10 to +45° C.

In principle, these can be applied to solid substrates; especially suitable are asphalt, asphalt-concrete mixtures, cast bitumen, concrete, plaster floor, ceramic tiles, a metal, such as steel or aluminum, as well as wood. Depending on the type of substrate, it is advantageous to apply a primer to the substrate, prior to application of the reaction resin of the invention. These primers are broadly known in the trade and can generally be commercially obtained.

Another object of the invention is a process for producing a low-odor surface coating in which a low-odor, cold-curing (meth)acrylate reaction resin for surface coating that consists of components A to E described above.

Curing generally occurs at temperatures in the range of −10 to +45° C. Such resins are called cold-curing resins.

An especially preferred embodiment of the process of the invention is characterized by the fact that curing occurs at ambient temperature (+10 to 30° C.).

Having generally described this invention, a further understanding can be obtained by reference to certain specific examples which are provided herein for purposes of illustration only and are not intended to be limiting unless otherwise specified.

The following Examples are also recited in the priority document, German patent application 198 26 412.7, filed Jun. 16, 1998, which is incorporated herein by reference in its entirety.

EXAMPLES

Examples 1 to 4, Comparison Examples 1–8

A composition of the following components was prepared by mixing:

| Compound | Parts by weight |
|---|---|
| n-Butylmethacrylate | 65.8 |
| ® Plexigum PM 381 | 25.0 |
| ® Tinuvin P (2-(2-hydroxy-5-methylphenyl)benzotriazol) | 0.2 |
| 4-Methyl-2,6-tert-butylphenol | 0.02 |
| N,N-bis (2-hydroxyethyl)-p-toluidine | 1.0 |
| Benzyl methacrylate | 0.2 |

PLEXIGUM PM 381 ® is a ground bulk polymer based on butyl methacrylate and methyl methacrylate.

To this composition were added the amounts of N,N-dimethyl-toluidine, 1,4-butanediol dimethacrylate (1,4-BDMA), and paraffins (melting point 50–52° C.). After the obtained compositions were well mixed, the indicate amount of BP-50-FT was stirred in 1 minute directly prior to curing.

BP-50-FT is a powder that contains 50 wt % dibenzoyl peroxide that has been inhibited with a dicyclohexyl phthalate. The resins were applied to concrete at a thickness of approximately 1 cm and set at ambient temperature for 90 minutes. The obtained results are shown in Table 1. Poor curing means that the resin was tacky after the indicated period of time. Good curing means curing of the system without tackiness.

All of the values given in Table 1 are parts by weight based on the total amount of reaction resin (Components A to E).

TABLE 1

| Test | Paraffin | N,N-dimethyl-p-toluidine | 1,4-BDMA | BP-50-FT | Curing |
|---|---|---|---|---|---|
| Comparative Example 1 | 1 | — | 1,5 | 2 | poor |
| Comparative Example 2 | 1 | — | 1,5 | 4 | poor |
| Comparative Example 3 | 1 | 0,3 | 1,5 | 2 | poor |
| Comparative Example 4 | 1 | 0,3 | 1,5 | 4 | poor |
| Comparative Example 5 | 1 | 0,5 | 1,5 | 2 | poor |
| Comparative Example 6 | 1 | 0,5 | 1,5 | 4 | poor |
| Comparative Example 7 | 3 | — | 1,5 | 2 | poor |
| Comparative Example 8 | 1 | — | 3 | 2 | poor |
| Example 1 | 3 | — | 3 | 2 | average |
| Example 2 | 3 | — | 3 | 4 | average |
| Example 3 | 3 | — | 5 | 2 | good |
| Example 4 | 3 | — | 5 | 4 | good |

Paraffin content and the proportion of a multifunctional (meth)acrylate produces good curing.

Other measures such as, for example, a change in the initiator or the proportion of accelerator do not lead to the desired effect. An increase in only 1,4-BDMA or paraffin is similarly ineffective.

Measurements over a period of five hours showed that upon application of the reaction resin, only very low amounts of butylmethacrylate were liberated to the surroundings (<10 ppm) so that a health hazard can be excluded.

Examples 5–8

In order to prepare a clear film, 25.0 parts by weight PLEXIGUM® PM 381 (Röhm GmbH) and 3.0 parts by weight molten paraffin (melting point 50–52° C.) were dissolved in a mixture of 65.8 parts by weight base monomer (see Table 2), 5.0 parts by weight 1,4-butanediol dimethacrylate, 0.2 parts by weight TINUVIN P® (2-(2-hydroxy-5-methylphenyl)benzotriazole, available from Ciba-Geigy, Switzerland) and 0.02 part by weight 4-methyl-2,6-di-tert-butylphenol at 60° C. After cooling to approximately 30° C., 1.0 part by weight N,N-bis(2-hydroxyethyl)-p-toluidine was added.

After the obtained compositions were well-mixed, 2 parts by weight BP-50-FT (see above) were stirred for 1 minute directly prior to curing. The resins were applied at a thickness of approximately 0.8 cm onto a paving block coated with HOSTAPHAN® film (available from Mitsubishi Polyester Films, Wiesbaden, Germany) and set at ambient temperature for 60 minutes. The obtained results are shown in Table 2.

To produce loaded coatings, a composition of 75 parts by weight quartz sand as the filler (Silimix mixture No. 270 from Westdeutsche Quartzwerke Dr. Müller GmbH, Dorsten) and 25 parts by weight of the binder (same composition as the corresponding clear film) were intensively mixed without an initiator.

After the obtained compositions were well-mixed, 2 parts by weight BP-50-FT (see above), based on the amount of binder, were stirred for 1 minute directly prior to curing. The compositions were applied at a thickness of approximately 0.8 cm onto a paving block coated with HOSTAPHAN® film and set at ambient temperature for 60 minutes. The obtained results are shown in Table 2.

TABLE 2

| Test | Base monomer | Clear film | Loaded coating |
|---|---|---|---|
| Example 5 | Isobutyl methacrylate | free of tackiness | free of tackiness |
| Example 6 | Hexyl methacrylate | free of tackiness | free of tackiness |
| Example 7 | Cyclohexyl methacrylate | free of tackiness | free of tackiness |
| Example 8 | Benzyl methacrylate | free of tackiness | free of tackiness |

It was shown that all of the above-indicated systems set without tackiness due to the combination of a high proportion of paraffin and a high content of multifunctional (meth)acrylate.

Obviously, numerous modifications and variations of the present invention are possible in light of the above teachings. It is, therefore, to be understood that within the scope of the appended claims, the invention may be practiced otherwise than as specifically described herein.

The invention claimed is:

1. A low-odor, cold-curing (meth)acrylate reaction resin for a floor coating, comprising:
   (A) at least one methacrylate selected from the group consisting of hexyl methacrylate, cyclohexyl methacrylate, and benzyl methacrylate; and 3–10 wt % of a multifunctional (meth)acrylate;
   wherein the sum of all components in (A) is 100 wt %;
   (B) 0–2 parts by weight per 1 part by weight of Component (A) of a pre-polymer that dissolves or swells in (A);
   (C) 2–5 parts by weight per 100 parts by weight based on Components (A)+(B) of at least one paraffin and/or wax;
   (D) a redox system, containing an accelerator and a peroxide catalyst or initiator in an amount that is adequate for cold-curing of Component (A); and
   (E) optionally, at least conventional additive.

2. The reaction resin according to claim 1, wherein said multifunctional (meth)acrylate is 1,4-butanediol dimethacrylate; component (B) is a polymer based on butyl methacrylate and methyl methacrylate.

3. The reaction resin according to claim 1, wherein the multifunctional (meth)acrylate and component (C) are together present in an amount effective for the reaction resin, when applied to concrete at a thickness of approximately 1 cm and set at ambient temperature for 90 minutes, to be non-tacky.

4. A low-odor, cold-curing (meth)acrylate reaction resin for a floor coating, comprising:
   (A) (a) 50–100 wt % of a (meth)acrylate comprised of
      0–5 wt % of a methyl (meth)acrylate;
      0–5 wt % of an ethyl (meth)acrylate;
      0–97 wt % of a $C_3$–$C_6$ (meth)acrylate;
      0–50 wt % of $\geq C_7$ (meth)acrylate;
      3–10 wt % of a multifunctional (meth)acrylate; and
   (b) 0–50 wt % of a comonomer, comprised of
      0–30 wt % of a vinyl aromatic; and
      0–30 wt % of a vinyl ester
   wherein the sum of all components of (a) and (b) in (A) is 100 wt %, and wherein component (A) includes at least one (meth)acrylate selected from the group consisting of methacrylates of unsaturated alcohols, nitrogen-containing methacrylates, carbonyl-containing methacrylates, cycloalkyl methacrylates, halogenated methacrylates, oxiranyl methacrylates, phosphorus-containing methacrylates, boron-containing methacrylates, silicon-containing methacrylates, sulfur-containing methacrylates, and corresponding acrylates having a boiling point greater than 120° C.;
   (B) 0–2 parts by weight per 1 part by weight of Component (A) of a pre-polymer that dissolves or swells in (A); and wherein the proportion of methyl (meth)acrylate or ethyl (meth)acrylate is less than 5 wt %, based on Component (B);
   (C) 2–5 parts by weight per 100 parts by weight based on Components (A)+(B) of at least one paraffin and/or wax;
   (D) a redox system, containing an accelerator and a peroxide catalyst or initiator in an amount that is adequate for cold-curing of Component (A); and
   (E) optionally, at least one conventional additive.

* * * * *